United States Patent
Redstone

(10) Patent No.: US 9,341,508 B2
(45) Date of Patent: May 17, 2016

(54) VOLUMETRIC MEASUREMENT DEVICE

(71) Applicant: Equatine Labs, Cambridge, MA (US)

(72) Inventor: Joshua Redstone, Cambridge, MA (US)

(73) Assignee: Equatine Labs, Inc., Cambridge, MA (US)

( * ) Notice: Subject to any disclaimer, the term of this patent is extended or adjusted under 35 U.S.C. 154(b) by 236 days.

(21) Appl. No.: 14/145,380

(22) Filed: Dec. 31, 2013

(65) Prior Publication Data

US 2014/0216154 A1    Aug. 7, 2014

Related U.S. Application Data

(60) Provisional application No. 61/760,636, filed on Feb. 4, 2013.

(51) Int. Cl.
    *G01F 19/00*      (2006.01)
    *A47J 47/00*      (2006.01)

(52) U.S. Cl.
    CPC ............... *G01F 19/00* (2013.01); *A47J 47/00* (2013.01); *A47G 2200/223* (2013.01); *A47J 2203/00* (2013.01)

(58) Field of Classification Search
None
See application file for complete search history.

(56) References Cited

U.S. PATENT DOCUMENTS

| | | | | |
|---|---|---|---|---|
| 6,035,907 A | * | 3/2000 | DeCoster | B67C 11/00 141/331 |
| 2009/0255333 A1 | * | 10/2009 | Henry | G01F 19/00 73/427 |
| 2015/0160062 A1 | * | 6/2015 | Breit | G01F 19/00 73/427 |
| 2015/0160064 A1 | * | 6/2015 | Kushner | G01F 19/00 73/427 |

FOREIGN PATENT DOCUMENTS

CN      103335687 A    * 10/2013

* cited by examiner

*Primary Examiner* — Andre Allen
(74) *Attorney, Agent, or Firm* — Loginov & Associates, PLLC; William A. Loginov

(57) ABSTRACT

The disclosure provides a volumetric measurement device that includes of a vessel into which contents to be measured are placed. The device has a target operational range of measurement volumes. The shape of the vessel has the property that the ratio of the surface area of contents in the vessel to the volume of those contents is constant across the operational range. For any source of error in the estimation of vertical height of contents, the constant ratio of surface area to volume prevents the error from having a larger negative impact on overall measurement error as the volume being measured decreases. In other words, the vessel is just at good at measuring small volumes of contents as large volumes of contents.

18 Claims, 3 Drawing Sheets

VOLUMETRIC MEASUREMENT DEVICE

RELATED APPLICATIONS

This application claims the benefit of U.S. Provisional Application Ser. No. 61/760,636, filed Feb. 4, 2013, entitled VOLUMETRIC MEASUREMENT DEVICE, the entire disclosure of which is herein incorporated by reference.

FIELD OF THE INVENTION

The present invention is in the technical field of volumetric measuring devices. A volumetric measuring device typically includes two principle parts. The first is a vessel into which the substance to be measured is placed or caused to accumulate. The second part is a mechanism to detect the vertical level of the substance, e.g., measurement markings on the side of a transparent vessel.

BACKGROUND OF THE INVENTION

Examples of volumetric measuring devices include kitchen measuring cups and rain gauges.

To use a volumetric measuring device, the user first puts contents into the vessel or otherwise causes the contents to be measured to accumulate in the vessel (e.g., placing a rain gauge outside to collect falling rain). Next, the user estimates the vertical level of the contents and translates that into a volume estimate. In the case of many translucent kitchen measuring cups, the estimate and translation is done by raising the vessel so that the top of the contents is at eye level, and then matching the top of the contents with line markings on the side of the vessel indicating specific volumes. The reading of vertical level and translation can alternatively be done by other electronic or mechanical means.

When estimating the vertical level of the contents, there will be error in the estimate. There are many sources of error. Examples include: (1) Variation in level of the contents across the surface of the contents; (2) Variation in the level due to inconsistently accounting for the height of the meniscus of the liquid; and (3) When visually estimating the vertical level relative to markings on the side of the vessel, not being perfectly perpendicular to the surface of the contents and the side of the vessel. This introduces error due to the thickness of the sides of the vessel.

Error in estimating the vertical level of contents, when multiplied by the surface area of the contents, translates into an error in the volume measurement, which is termed 'error volume', below. When evaluating measurement error, typically the user is interested in the relative error—that is, the error volume relative to the volume of contents being measured.

Many sources of error in estimating the vertical level of contents are present over the entire operational range, i.e., whether the vessel is almost full or almost empty.

A problem with existing volumetric measurement devices is that the absolute error volume does not decrease adequately as the volume of contents decreases. Therefore, the relative error, that is, the error volume as a fraction of the volume being measured, becomes larger when measuring a small amount of contents (e.g., measuring ¼ cup in a 2-cup measuring cup). The problem is partly because the error in estimating the vertical level may not decrease adequately when measuring a smaller volume of contents. The problem is also partly because the surface area of the contents may not decrease adequately. This increase in relative error when measuring small volume of contents typically becomes unacceptable, forcing the user to utilize an alternative measuring device.

SUMMARY OF THE INVENTION

The present invention is a volumetric measuring device that reduces relative measurement error across the entire operational volume range.

BRIEF DESCRIPTION OF THE DRAWINGS

The invention description below refers to the accompanying drawings, of which.

DETAILED DESCRIPTION

Figure 1:
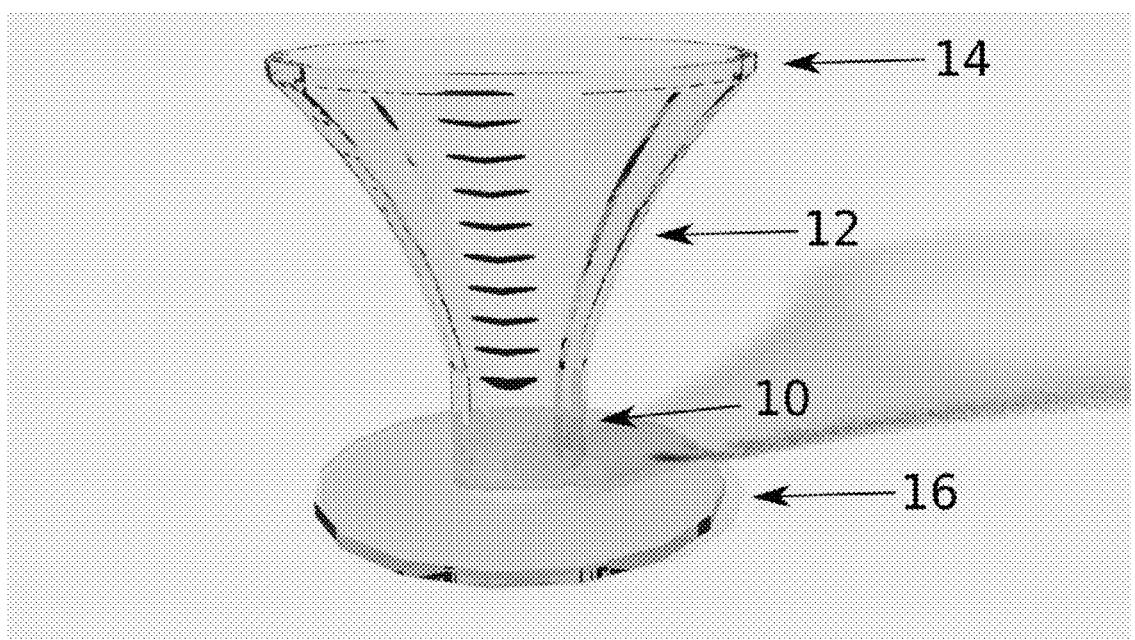
FIG. 1 is a perspective view of a preferred embodiment of the present disclosure.
Figure 2:
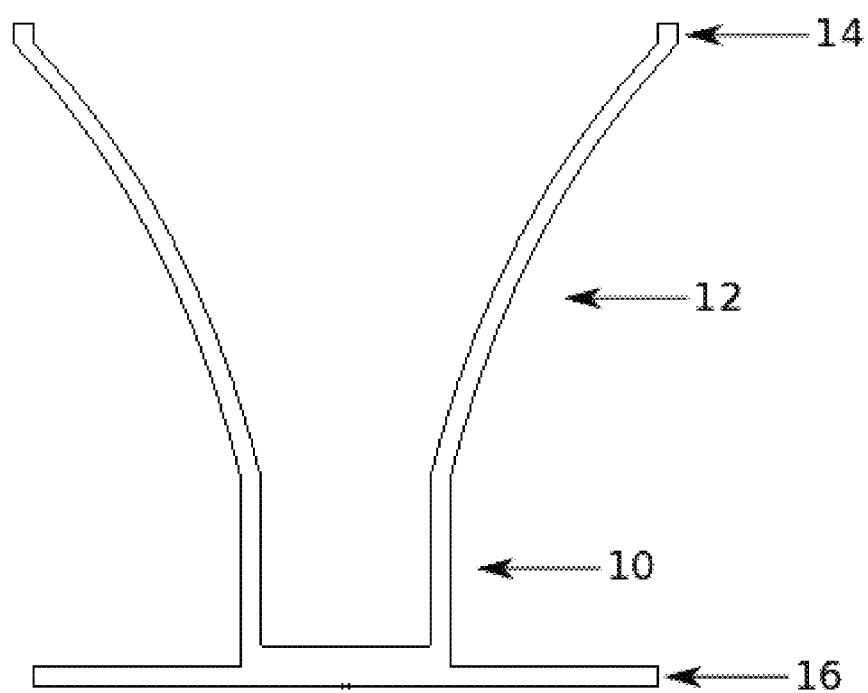
FIG. 2 is a vertical cross-section of the device in FIG. 1.
Figure 3:
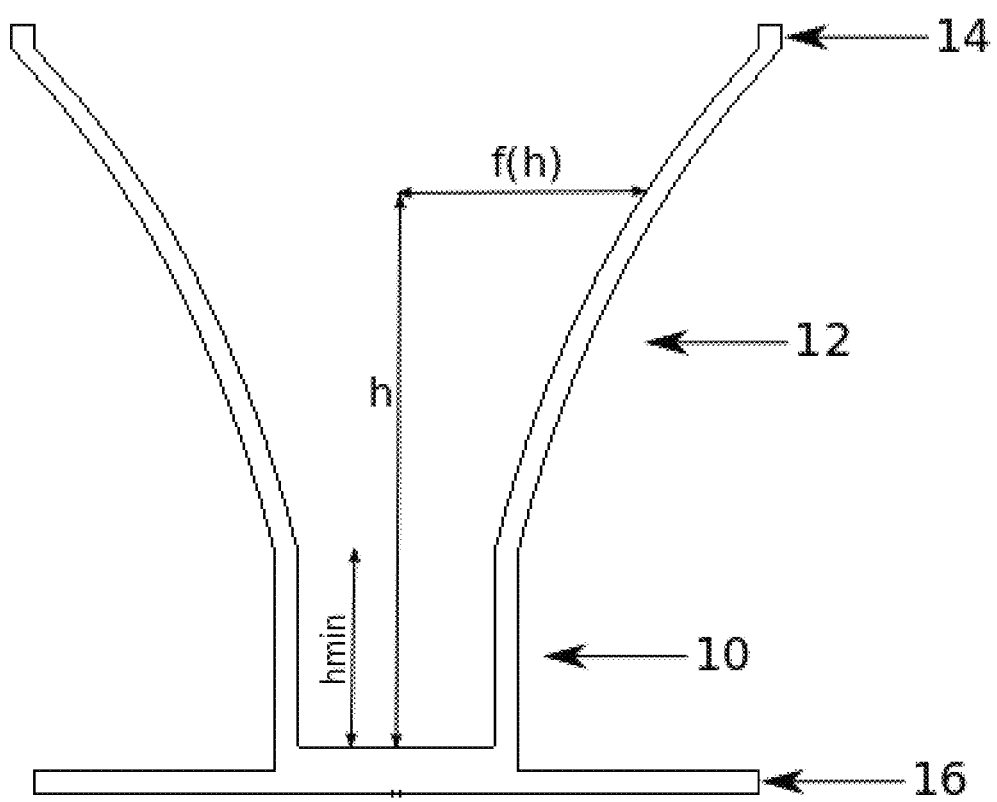
FIG. 3 is an annotated vertical cross-section of the device in FIG. 1.

Referring now to the invention in more detail, in FIG. 1 there is shown an embodiment of the invention that is a measuring cup. It includes a radially-symmetric, transparent vessel 10, 12, 14 mounted on a base 16. The vessel includes a thin wall of constant thickness. The vessel is made of a transparent material. There are measurement markings on the side of the vessel that include horizontal lines and text indicating the volume in the vessel up to the lines. FIG. 2 depicts a vertical cross-section of the device shown in FIG. 1. FIG. 3 is a vertical cross-section of the device shown in FIG. 1 with the addition of three labeled distances, $h_{min}$, h and f(h), explained below.

In more detail, still referring to FIG. 1, the vessel has a target operational range. The minimum of the range is the volume within the vessel of the cylindrical portion 10 of the vessel. This is equivalent to a volume of contents up to the height $h_{min}$ in FIG. 3. The maximum of the range is the volume in the vessel up to top of the outward curving section 12 of the vessel. There is a lip 14 to the vessel in FIG. 1 that serves to prevent contents from spilling from the vessel.

In this embodiment, the user first place contents in the vessel or otherwise causes contents to accumulate in the vessel. The user then estimates the vertical level of the surface of the contents in the vessel. The user then identifies the horizontal line closest to the surface of the contents. The volume estimate is then the volume indicated in text next to the horizontal line.

In further detail, still referring to FIG. 1, the key, innovative property of the vessel shape that reduces measurement error is that, over its target operational volume range, the ratio of the surface area of the contents to the volume of the contents is constant. In other words, for any volume of contents in the vessel within the target operational range, the surface area of the contents inside the vessel is equal to a constant fraction of the volume of contents in the vessel.

There are several ways of expressing this property mathematically. One such example is provided below. Consider the vessel in FIG. 3, with a volume of contents filling the vessel up to the height labelled as h in that figure. h is a parameter that ranges from 0 when the vessel is empty up to the maximum height of contents when the vessel is full. The surface of the contents at height h will be circular since the vessel is radially symmetric. A function is defined, f(h), indicated in FIG. 3, that describes the inner radius of the vessel at height h. The surface area of the contents can then be expressed as $\pi f^2(h)$.

The expression for the volume of the contents in the vessel filled up to height h can be expressed as:

$$\int_0^h \pi f^2(z) dz$$

where z is the variable of integration.

Combining the expressions above for surface area and volume, the requirement that the ratio of surface area to volume be constant then becomes:

$$\frac{\pi f^2(h)}{\int_0^h \pi f^2(z) dz} = k$$

where k is the constant. This expression is a differential equation in integral form, the solution to which defines the function f(h) that specifies the shape of the vessel. The main component of f(h) is a term exponential in h.

The differential equation has boundary conditions that constrain the shape. The primary constraint is that, in order for the solution to describe a vessel that has a finite height and a non-zero minimum radius, there must be a minimum content volume (or equivalently a minimum content height) below which the ratio of surface area to volume ratio need not be constant. In this regard, the vessel can be assigned a minimum operating range. In FIG. 3, $h_{min}$ denotes the minimum operating range, expressed as the minimum content height.

The construction of the vessel in the invention in FIG. 1 may be of any translucent material, including glass or plastic. The vessel may be scaled up or down to any size and operational range that preserves the constant ratio of surface volume to total volume over the target operation range.

Maintaining a constant ratio of surface area to volume has the beneficial property that, for vertical measurement error that has constant magnitude, the relative measurement error (the ratio of error volume to total volume) is also constant. In other words, the accuracy does not degrade as the volume being measured decreases. For example, measuring ¼-cup of contents in a vessel of 2-cup capacity is just as accurate as measuring 2 cups in the vessel. The benefit persists to a lesser degree for sources of vertical measurement error that increase as the volume of contents decreases. The impact of the beneficial property is that the measuring device maintains accuracy over a larger operational range.

In an illustrative embodiment, the disclosure provides a volumetric measurement device including a vessel which is shaped so that the ratio of surface area to volume is constant over its operational range. While FIGS. 1 and 2 depict a preferred embodiment, it is understood that other embodiments may vary aspects of the design in FIG. 1 and FIG. 2.

In one example, the base 16 of FIG. 1 may be any construct that prevents the vessel from tipping over. An alternative construct is struts that attach to sides of the vessel and prop it up from multiple sides.

In another example, the lip 14 of FIG. 1 may be constructed in alternative ways to prevent contents from spilling out of the vessel. This includes a taller lip, a curved lip, or a lip angled in towards the center of the vessel.

In another example, the lip 14 of the vessel in FIG. 1 may include a spout to facilitate pouring contents out of the vessel without contents running down the side of the vessel.

In yet another example, the vessel may use other mechanisms to estimate the vertical level of contents. This includes other forms of markings on the vessel or markings on other portions of the vessel. It also includes any automated mechanism to measure content level. An example is optical scanning of the vessel, content or markings. Another example is electrical or mechanical contacts within the vessel that close or open in the presence of contents at the level of the contact. Any mechanisms for estimating the vertical level will be subject to sources of error in the estimate of vertical level of the contents. The benefits of the invention described in this document apply to such sources of error.

In yet another example, the vessel may include a fixed volume of liquid and function by measuring rise in the level of this liquid. That is, it may measure by displacement. For example, placing a solid object in the vessel will raise the contents of the liquid and the volume of the solid can be measured by measuring the rise of the liquid. In such embodiments, the same sources of error in estimating the level of the fixed volume of liquid may be present and so the benefits of this invention apply as well.

In still another example, there may be an additional measurement mechanism for measuring volumes below the minimum target operational range. For volumes in this range, the property of constant ratio of surface area to volume will not hold, but it is still possible to use existing measurement techniques in the region. An example is adding measurement markings to the sides of the cylindrical region 10 in the invention in FIG. 1.

In still another example, the measurement device may be designed for or used in other applications including rain gauges, laboratory measurement devices, bartending measurement devices as well as kitchen measuring cups.

In still another example, the vessel need not be radially symmetric. Any shape that maintains a constant ratio of surface area to volume will benefit from the improve accuracy described above. Examples of alternative shapes would be vessels that are square or oblong in their horizontal cross-section.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A volumetric measuring device for measuring contents, comprising:
   a curved section, wherein, for each height h along an entire height of the curved section, a surface area of contents in the device at height h is in constant proportion to a volume of contents in the device.

2. The device of claim 1, further comprising:
   a base; and
   a cylindrical section adjacent to the base.

3. The device of claim 2 wherein the cylindrical section has a height $h_{min}$, which defines a minimum operating range of the measuring device.

4. The device of claim 1, further comprising a lip adjacent the curved section configured to prevent contents from spilling the device.

5. The device of claim 3, wherein a lower portion of the lip defines a maximum operating range of the measuring device.

6. The device of claim 2, wherein the base, the cylindrical section, and the curved section are radially symmetric.

7. The device of claim 1, wherein the curved section comprises measurement markings.

8. The device of claim 1, wherein the curved section comprises a sidewall defining an inner surface for receiving the contents, the sidewall having a constant thickness.

9. The device of claim 7, wherein the sidewall defines an inner radius and the surface area at height h is a function of the inner radius at height h.

10. The device of claim 1, wherein the measuring device is transparent.

11. The device of claim 1, wherein the contents comprise liquid contents.

12. A volumetric measuring device, comprising:
a minimum operating range section having a height $h_{min}$, which defines a minimum operating range of the measuring device; and
a curved section adjacent the minimum operating range section, wherein, for each height h along an entire height of the curved section, a surface area of contents in the device at height h is in constant proportion to a volume of contents in the device.

13. The device of claim 12, further comprising:
a lip adjacent the curved section configured to prevent contents from spilling the device.

14. The device of claim 12, wherein the minimum operating range section comprises a cylindrical section.

15. A volumetric measuring device, comprising:
a vessel comprising an inner surface configured to receive contents, wherein, for each height h along a section of the inner surface, a surface area of contents in the device at height h is in constant proportion k to a volume of contents in the device, wherein k is defined such that $$\frac{\pi f^2(h)}{\int_0^h \pi f^2(z) dz} = k,$$

wherein f(h) is a function representing the inner surface of the vessel at height h.

16. The device of claim 15, wherein the vessel comprises a curved section defining the inner surface.

17. The device of claim 15, wherein the vessel further comprises a base, a cylindrical section, and a lip.

18. The device of claim 17, wherein the cylindrical section defines a minimum operating range of the vessel.

* * * * *